United States Patent [19]
Fort et al.

[11] 3,960,772
[45] June 1, 1976

[54] AGGLOMERATED ALUMINA-BASED SPHERICAL GRAINS

[75] Inventors: Jean-Paul Fort, Antony; Max Michel, Yerres, both of France

[73] Assignee: Rhone-Progil, Courbevoie, France

[22] Filed: Mar. 27, 1974

[21] Appl. No.: 455,233

[30] Foreign Application Priority Data
Mar. 27, 1973 France .............................. 73.10899

[52] U.S. Cl. ............................ 252/455 R; 252/463; 252/477 R
[51] Int. Cl.² ...................... B01J 21/04; B01J 29/06
[58] Field of Search ............... 252/455 R, 463, 448; 423/625

[56] References Cited
UNITED STATES PATENTS

| | | | |
|---|---|---|---|
| 2,449,051 | 9/1948 | Breth et al. | 252/463 X |
| 2,584,428 | 2/1952 | Pierce et al. | 252/448 |
| 3,154,603 | 10/1964 | Witheford et al. | 252/448 X |
| 3,173,883 | 3/1965 | Cornelius et al. | 252/448 |
| 3,228,891 | 1/1966 | Duke | 252/448 |
| 3,390,100 | 6/1968 | Chomitz et al. | 252/463 X |
| 3,515,684 | 6/1970 | McEvoy | 252/448 X |
| 3,714,313 | 1/1973 | Beiding et al. | 252/463 X |

*Primary Examiner*—W. J. Shine
*Attorney, Agent, or Firm*—McDougall, Hersh & Scott

[57] ABSTRACT

The invention concerns alumina-based spherically shaped grains produced from pastes of moistened particles. These grains are produced by subjecting the pastes, in the form of grains of any shape whatever, to the action of mechanical vibrations of frequencies within the range of from a few herz, in liquids which are slightly or not at all water-miscible. To the alumina, which is the main component, particles of various natures and acids, bases and various compounds which are dissolved in the water used for preparing the pastes, can be added. Once matured, dried and calcined, the grains have a very high level of resistance to attrition, a porosity comprising pores of large dimensions, and can be used in particular for adsorption, chromatography and catalysis.

10 Claims, No Drawings

AGGLOMERATED ALUMINA-BASED SPHERICAL GRAINS

The present invention concerns alumina-based spherically shaped grains produced by the action of mechanical vibrations on pastes of moistened alumina-based particles which are shaped into grains of any form whatever.

It is known that alumina, in the form of agglomerates of different shapes and having specific surface areas which can be of various values, can be put to numerous uses, in particular, for adsorption, catalysis and chromatography.

A method which is widely used in industry for the production of alumina agglomerates comprises moistening alumina hydrates which have been partially dehydrated in a stream of hot gases; shaping them, for example in a rotary granulator, by compression or by extrusion; leaving the agglomerates to mature in a damp atmosphere, which causes them to harden; then, after drying, calcining them at temperatures which are dependent on the specific surface areas desired. In particular, the process of agglomeration in a rotary granulator, which is very often used, results in agglomerates which are substantially spherical in shape, and which are very widely used, in particular, as catalyst carriers and as desiccating agents, in particular for gases. The hardening of such agglomerates is due to a setting phenomenon which is similar to that of hydraulic binders and which follows the re-hydration of the aluminas.

Another method comprises starting with alumina sols which, by division in liquids which are slightly or not at all water-miscible, assume the shape of droplets which are progressively gelled into the form of spherical grains by the action of temperature and various chemical compounds, the grains then being washed, dried and calcined.

However, these methods suffer from some disadvantages. On the one hand, the method involving gelling of droplets often gives products of relatively small pore volumes with a generally monomodal pore distribution, which products are often fissured because of the high proportion of water in the gels produced causing substantial shrinkage during drying, while on the other hand the method involving agglomeration in a rotary granulator involves difficulties in producing grains of very small or very large diameters and a sufficiently compact range of grain sizes. Moreover, the agglomerates produced in a rotary granulator have a limited resistance to attrition because of their slightly rough surface, and study of diametral (cross) sections shows heterogenous portions which are probably due to the agglomerates having been grown by the formation of successive layers.

There is now proposed a novel method for producing alumina or alumina-based grains by the agglomeration of particles, of substantially spherical shapes, whose diameters can be determined at from approximately 1 to 10 millimeters, and which are devoid of the previous defects. The method comprises moistening compositions in which the only constituents or the main constituents are particles of alumina of the boehmite variety and/or particles of aluminas produced by partial dehydration of alumina hydrates in the form of gels and/or in crystalline forms in a stream of hot gases, so that the compositions are in the form of pastes having a consistency sufficient to make them capable of being converted, for example, by crumb-formation and sieving, into grains of any shapes whatever but of masses of the desired values; maintaining said grains in a liquid, which is slightly or not at all water-miscible, and subjected to mechanical vibrations during the period necessary to cause them to assume the spherical shape. In most cases, and in known manner, the grains produced in this way are caused to mature for the purposes of hardening, then dried, and activated by calcination for the purpose of imparting to them the desired specific surface area.

It should be noted that this method is profoundly different from the method which comprises producing spherical grains by gelling droplets of sols in liquids which are slightly or not at all water-miscible, since, in the latter case, the sperical shape of the grains results simply from the effect of surface tension on sols which are sufficiently non-viscous. In contrast, in the case of the present method, surface tension alone cannot impart the spherical shape to the grain of any shapes whatever, which comprise solid particles agglomerated in the form of pastes; it is believed that the result of the action of the vibrations, which is absolutely essential, is due to particular rheological properties of the alumina pastes used, which present expansion properties.

The other solid constituents of the alumina-based compositions can be different particles, giving the compositions their rheological properties. The nature thereof must be selected depending on the aims sought, for example catalytic, their degree of fineness still being relatively large. Such other constituents can include, for example, oxides and silico-aluminates, such as molecular sieves.

The essential part of the present invention, that is to say, bringing the grains of any shapes whatever into contact with a liquid which is subjected to mechanical vibration, can be carried out in various ways and in accordance with various modes of operations.

One of the easiest ways comprises causing the grains of any shapes whatever to fall under the effect of gravity in a vertical column filled with a suitable liquid and resting on a vibrating table, recovery of the spherical grains produced being effected at the bottom of the column, for example, by means of suitable conduits.

A preferred device comprises generally vibrating the liquid of a vertical column by immersing therein vibration-generating means and by recovering, as above, the spherical grains produced, at the bottom of the column. Improved embodiments of this device comprise passing the grains through a clearly defined zone of a vertical column in which vibrations are produced; this zone can be produced in a simple manner by using generating means producing beams of vibrations which are directed transversely to the axial direction of the column. The zone mentioned can also correspond to the intersection of a vertical column and a horizontal tube member disposed at the desired location, a vibration generating means being placed at one of the ends of the horizontal tube member and the other end of the tube member being absorbent in respect of the frequency of vibrations used or, in contrast, being reflecting in order then to cause the formation of standing waves.

Other devices can also be used in which the grains of any shapes whatever are treated by admitting them into a stream of a liquid which is not at all or slightly water-miscible, and which is subjected over a part of its path of movement to vibrations which may or may not generate standing waves.

The different parameters to be adjusted, depending on the case in point, depend in particular on the dimensions of the grains of any shapes whatever, and are inter alia the frequency of the vibrations, which can range from a few herz to, for example, 100,000 herz and preferably from 10,000 to 50,000 herz, the power dissipated, which can reach 100 watts per cubic decimeter, and the contact time of the grains with the vibrating zone, which can reach 10 seconds.

Other important parameters are the properties of the liquids in which the grains to be made spherical are placed, and, for example, their density and viscosity, which should be considered in relation to temperature which moreover acts on the hardening times. Other properties of these liquids can be used, for example their chemical properties, for modifying the speed of hardening of the agglomerates produced. Moreover, it is possible to use a plurality of liquids of different natures which are not miscible with each other.

Obviously, the means for vibrating liquids are known and do not form any part of this invention. The generating means, selected for use, will depend on the frequency and the power employed, the most advantageous generating means obviously being electrical generating means to which different types of electro-magnetic or piezoelectric vibrators are connected. The amount of water required for forming the grains of any shapes whatever can vary but is generally relatively critical for a well-defined alumina-based starting composition. For example, for the initial preparation of grains produced from dehydrated hydrargillite in the form of fine particles, the amount of water added to this alumina, when the grain sizes of the particles is from 4 to 40 microns, is such that the paste produced preferably contains from 50 to 60% by weight of alumina. However, it is possible to use amounts of water which are a little higher, but the spherical grains obtained after vibration of such pastes can be easily deformed before maturing, which makes recuperation thereof more difficult.

Finally, it is possible to vary the pH value of the water by making it acid or basic, in order, in some cases, to increase the strength of the spherical bodies produced. It is possible to dissolve therein different compounds which are capable of modifying the properties of the spherical bodies produced, for example for the purposes of catalysis.

A certain number of non-limiting examples of the production of spherical alumina grains are hereinafter given in order to illustrate the present invention. The table, following the examples, summarizes the characteristics in respect of porosity, specific surface area, adsorption, resistance to crushing and resistance to attrition of the products obtained, and the characteristics of products in the form of balls, which are produced either in a rotary granulator or by shaping by gelling sol drops in columns filled with liquids.

EXAMPLE 1

Hydrargillite is treated in a dehydration apparatus by means of a rising flow of hot gases, whose inlet temperature is substantially 1000°C. The powder produced, which is separated from the gases in a cyclone separator, has a water loss, as measured by calcination at high temperature, of 5%. It is formed of particles of diameters of from 20 to 100 microns. This powder, which is referred to hereinafer as powder A, is mixed with water in a mixer so as to produce a paste whose alumina content by weight, expressed as $Al_2O_3$, is 60%. This paste is slightly compressed in a crumb-forming apparatus which, positioned above a shaping column, feeds the column with grains of substantially identical masses of the desired value for producing balls of the required diameter, but of irregular shapes. The shaping column comprises a vertical lower tube which is 75 mm in diameter and 2.5 m in height, and a larger upper portion whose diameter is 100 mm over a length of 0.40 m. The column is filled with a mineral oil heated to 45°C by means of electrical resistors wound around the outside wall of the column. At this temperature, the specific gravity of the oil is 0.85, and its viscosity is 50 centipoises. The upper portion of the column is subjected to vibrations produced by an ultrasonic generator, having a power output of 75 W, and operating at a frequency of 40,000 herz. The vibrations are emitted within the liquid, at a few centimeters from the surface thereof, and are directly downwardly. As they pass through this vibrated zone, the grains, from the crumb-forming apparatus, assume a liquid consistency and are converted into spheres which are about 7 mm in diameter, after a time which is less than about 3 seconds. The spheres reach the lower part of the column after about 15 seconds. The absence of any vibration and the temperature of the medium in this zone promote hardening of the balls produced, which then enjoy sufficient cohesion so as not to stick together nor to be deformed. A slow flow of oil in a horizontal tube member permits recovery thereof. The balls are then washed with a volatile solvent which removes their surface skin of oil. Then, once drained off, the balls are subjected to a hydrothermal treatment by means of saturating steam at 100°C for 8 hours. The balls are then subjected to a drying operation at 150°C, and calcining in an electric furnace at 450°C. Smooth, highly spherical balls are produced, having a narrow range of grain sizes.

Studying diametral cross-sections of the balls produced, with a binocular magnifier (telescope), reveals no heterogeneity, whereas the same study of balls produced in known manner in a rotary granulator with the same starting material clearly shows the buildup in size of the balls by the formation of successive layers.

EXAMPLE 2

Some of powder A is crushed in a ball crusher so that 95% of the particles of the new powder produced are of a diameter of from 1 to 30 microns. The powder, which is referred to hereinafter as powder B, is mixed with water, so as to produce a paste whose alumina content by weight, expressed as $Al_2O_3$, is 57.5%. This paste is transferred into a cylindrical supply container which is 15 cm in diameter and having a base formed of a perforated plate with holes which are 2 mm in diameter and is immersed in the liquid filling the shaping column. The container is vibrated at a rate of 50 herz, which permits liquefaction of the paste and shaping thereof into highly elongate drops, by passing through the perforations in the bottom of the container. The column comprises a cylinder which is 3 m in height and 0.60 m in diameter, filled with trichloroethylene, maintained at a temperature of 45°C by an external heat exchanger. Secured to the inside surface of the column in the upper region thereof, at from 40 to 80 cm from its top, is a ring carrying 3 steel plates which are 40 cm in height and 30 cm in width and which are arranged parallel to the axis of the column, to form the three faces of a regular prism. Welded onto each plate are three ultrasonic transducers with a total power of 500 W, fed by a generator generating at a frequency of 26,000 herz. Thus, these three plates transmit intense ultrasonic beams which converge towards the axis of the column.

The drops, supplied by the 50 herz vibrator, solidify in their elongate shape as soon as they pass into the column, but are liquefied afresh by passing into the part of the column which is subjected to ultrasonic vibration. They then assume the shape of spherical balls which fall slowly towards the base of the column and which are collected continuously. They are then drained and subjected to a hydrothermal treatment for 8 hours at 100°C, before being dried and calcined for 2 hours at 450°C.

EXAMPLE 3

Operation is in the same general manner as in the preceding example. In this case, the alumina content by weight of the paste, expressed as $Al_2O_3$, is 55% and the total length of the shaping column is 10 m. The balls which are produced in this way are more porous than those produced in the previous example.

EXAMPLE 4

A paste whose alumina content by weight, expressed as $Al_2O_3$, is 59%, is prepared from powder B and water. It is fed into the shaping column, described in Example 2, by way of a crumb-forming apparatus which produces grains of small dimensions. After extraction, draining, hydrothermal treatment, drying and calcining, balls having a diameter of from 1 to 1.5 mm are produced.

EXAMPLE 5

An aluminum alcoholate is subjected to hydrolysis. The produced hydroxide precipitate is washed, dried without heating and then dried by spraying in hot gases in the vicinity of 200°C. This produces a powder whose grain sizes are from 10 to 80 microns, formed entirely of fine boehmite. Water, which is 0.1 N acidulated by nitric acid, is added in a mixer to this powder, which is referred to hereinafter as powder C, so as to produce a paste whose alumina content by weight, expressed as $Al_2O_3$, is 44%.

Using the device described in Example 1, the crumb-forming apparatus is regulated so as to produce balls whose diameter is 3 ± 0.5 mm. After extraction from this column, the balls are washed with naphtha, matured in a moist atmosphere, then dried in a drying oven and calcined for 2 hours at 450°C.

EXAMPLE 6

A solution of sodium aluminate, containing 100 g/l of alumina, expressed as $Al_2O_3$, is continuously precipitated by a solution of 3 N nitric acid, at a pH value which is maintained at 8.7, and at a temperature of 35°C. The alumina gel suspension, which issues from the reaction vessel, then passes, for the purposes of homogenization, into a buffer tank which is also maintained at a temperature of 35°C, from which it is passed over a continuous filter. The resulting filter cake is washed with permuted water until the ions in the filgrate disappear, then dried without heating. The dried cake is re-suspended by stirring in permuted water, so that it can be sprayed, by means of a nozzle at the base of an apparatus, for dehydration by a rising flow of hot gases produced by the combustion of propane. The inlet temperature of the gases is 600°C, their temperature at the outlet is 300°C, and the contact time is about 1 second. The resulting powder, which is separated from the gases in a cyclone separator, has a water loss of 22%, as measured by high-temperature calcination, and an apparent density of 0.30 g/ccm. It is formed of substantially spherical particles having a diameter of less than 70 microns, 80% of the particles having a diameter of less than 44 microns. Water, which is 0.1 N acidulated by nitric acid, is added to this powder in a mixer, so as to produce a paste whose alumina content is 22%. The procedure and the apparatus described in Example 1 are used to produce balls having a diameter of 3 mm. These balls are drained, matured in a damp atmosphere, dried and calcined for 2 hours at 600°C.

EXAMPLE 7

A mixture of powders is formed, comprising 90% of powder B and 10% of technical zinc oxide in the form of very fine particles. By the addition of water in a mixer, a paste is prepared whose total water content is 41%. The procedure and the apparatus described in Example 1 are used to produce balls having a diameter of 3 mm. These are washed, subjected to a hydrothermal treatment for 8 hours at 100°C, and then dried and calcined for 2 hours at 450°C.

EXAMPLE 8

A mixture of powders is made, comprising 50% of powder B and 50% of 3 molecular sieve in the form of monocrystals of from 2 to 6 microns. By the addition of water in a mixer, a paste is prepared whose total water content is 51%. The procedure and the apparatus described in Example 1 are used to produce balls having a diameter of 3 mm. These are then washed and treated as specified in the preceding example.

TABLE

| EXAMPLE | TOTAL PORE VOLUME ccm/g | MACROPOROUS VOLUME (PORES OF DIAMETER >0.1 MICRON ccm/g | SPECIFIC SURFACE AREA sq.m/g | RESISTANCE TO GRAIN BY GRAIN CRUSHING kg | RESISTANCE TO ATTRITION % | GRANULOMETRIC DISTRIBUTION |
|---|---|---|---|---|---|---|
| 1 | 0.56 | 0.12 | 315 | 16 | 99 | 98% of balls of diameter of from 7 to 9 mm |
| 2 | 0.62 | 0.17 | 290 | 8 | 99.5 | 90% of balls of diameter of from 3 to 4 mm |
| 3 | 0.72 | 0.28 | 300 | 6 | 99 | 90% of balls of diameter of from 3 to 4 mm |
| 4 | 0.59 | 0.13 | 285 | 2.5 | 99.7 | 75% of balls of diameter |

TABLE-continued

| EXAMPLE | TOTAL PORE VOLUME ccm/g | MACROPOROUS VOLUME (PORES OF DIAMETER >0.1 MICRON ccm/g | SPECIFIC SURFACE AREA sq.m/g | RESISTANCE TO GRAIN BY GRAIN CRUSHING kg | RESISTANCE TO ATTRITION % | GRANULOMETRIC DISTRIBUTION |
|---|---|---|---|---|---|---|
| | | | | | | of from 1 to 1.5 mm 15% of balls of diameter of from 1.5 to 2 mm |
| 5 | 0.65 | 0.21 | 260 | 3 | 99.9 | 90% of balls of diameter of from 3 to 4 mm |
| 6 | 1.15 | 0.43 | 200 | 2 | 99.3 | 90% of balls of from 2.5 to 3.5 mm |
| 7 | 0.58 | 0.14 | 260 | 7 | 99 | 80% of balls of from 2.5 to 3.5 mm |
| 8 | 0.40 | 0.08 | | 4 | 97 | 80% of balls of from 2.5 to 3.5 mm |
| Balls produced in a rotary granulator | 0.60 | 0.17 | 300 | 7 | 92 | 35% of balls having a diameter of less than 3 mm 40% of balls having a diameter of from 3 to 4 mm 25% of balls having a diameter of more than 4 mm |
| Balls produced by gellification of drops of sol | 0.46 | 0.01 | 270 | 3.5 | 99.7 | 90% of balls of from 3 to 4 mm |

Various conclusions can be drawn from the results of this table: the spherical grains produced according to the practice of this invention are of more regular grain size distribution than the balls produced in a rotary granulator, and they have a better resistance to attrition. In comparison with the method involving gelling sol drops, the present method produces porosities, and more particularly porosities in the form of large pores, which are substantially larger. It is also possible to vary this porosity within relatively wide limits.

We claim:

1. A method of producing spherical members of alumina-based grains formed primarily of particles of alumina selected from the group consisting of alumina hydrate and alumina produced by partial dehydration of gels or crystals of alumina hydrates in a stream of hot gases, characterized by moistening said alumina-based particles with water to form a paste of the alumina-based particles, forming said pastes into grains of any shape, introducing said grains into a substantially immiscible liquid, subjecting the liquid to mechanical vibrations while the grains are contained therein whereby the grains form into spherical members, separating the spherical members from the liquid, hydrothermally treating, drying and calcining the spherical members.

2. A method according to claim 1 characterized in that the frequency of the vibrations is from a few herz to 100,000 herz.

3. A method according to claim 1 characterized in that the composition includes silico-aluminates.

4. A method according to claim 1 in which the grains of any shapes whatever are passed into a column of the liquid.

5. A method according to claim 4, characterized in that the column is vertical and that the grains of any shapes whatever pass downwardly in the column of liquid.

6. A method according to claim 4 characterized in that the vibrations are applied in the axial direction of the column.

7. A method according to claim 4 characterized in that the vibrations are applied along an axis transverse to that of the column.

8. A method according to claim 1 characterized in that the vibrations generate standing waves.

9. A method according to claim 1 characterized in that the frequency of the vibrations is from 10,000 to 50,000 herz.

10. A method as claimed in claim 1 comprising treating the grains of any shape whatever by admitting said grains into a flow of a substantially water immiscible liquid, and subjecting the grains to vibrations over a part of the path of movement through the liquid.

* * * * *